United States Patent
Haase et al.

(10) Patent No.: US 12,368,037 B2
(45) Date of Patent: Jul. 22, 2025

(54) DEVICE FOR DESORPTION SCANNING OF ANALYTE MATERIAL ON A SAMPLE SUPPORT

(71) Applicant: Bruker Daltonics GmbH & Co. KG, Bremen (DE)

(72) Inventors: Andreas Haase, Bremen (DE); Marcel Niehaus, Bremen (DE); Jens Höhndorf, Bremen (DE)

( * ) Notice: Subject to any disclaimer, the term of this patent is extended or adjusted under 35 U.S.C. 154(b) by 504 days.

(21) Appl. No.: 18/051,772

(22) Filed: Nov. 1, 2022

(65) Prior Publication Data
US 2023/0145540 A1     May 11, 2023

(30) Foreign Application Priority Data
Nov. 5, 2021  (DE) .............. 102021128848

(51) Int. Cl.
*H01J 49/04*  (2006.01)
*G06T 7/70*   (2017.01)

(52) U.S. Cl.
CPC ............ *H01J 49/0418* (2013.01); *G06T 7/70* (2017.01)

(58) Field of Classification Search
CPC .............................. H01J 49/0418; G06T 7/70
See application file for complete search history.

(56) References Cited

U.S. PATENT DOCUMENTS

| | | |
|---|---|---|
| 2004/0183009 A1 | 9/2004 | Reilly et al. |
| 2006/0071160 A1 | 4/2006 | Haase et al. |
| 2006/0186332 A1 | 8/2006 | Haase et al. |
| 2008/0017793 A1 | 1/2008 | James et al. |
| 2008/0191131 A1 | 8/2008 | Hohndorf et al. |
| 2010/0000338 A1 | 1/2010 | Van Berkel et al. |
| 2010/0002905 A1 | 1/2010 | Van Berkel et al. |
| 2010/0044563 A1 | 2/2010 | Harada et al. |

(Continued)

FOREIGN PATENT DOCUMENTS

WO     2002084577 A1     10/2002

OTHER PUBLICATIONS

Aizikov,K. et al., "Vacuum compatible sample positioning device for matrix assisted laser desorption/ionization Fourier transform ion cyclotron resonance mass spectrometry imaging", Review of Scientific Instruments 82, 054102 (2011).

(Continued)

*Primary Examiner* — Wyatt A Stoffa
*Assistant Examiner* — Hanway Chang
(74) *Attorney, Agent, or Firm* — Benoît & Côté, Inc.

(57) ABSTRACT

The invention relates to devices and methods for desorption scanning of analyte material deposited on a sample support, which can comprise the following mode of operation: (a) setting a position of the support to approach an impingement region onto which a beam is directed for local desorption of analyte material; (b) determining an actual position of the support after setting the position; (c) comparing the determined actual position with a target position of the support to determine any deviation; (d) adjusting a beam orientation, if a deviation is detected, so that the beam is directed onto the impingement region on the support that results when there is no deviation; (e) applying the beam to the impingement region to locally desorb analyte material and deliver it to an analyzer; and (f) checking whether a predetermined end condition is satisfied and, if not, repeating steps (a)-(e) for a subsequent non-congruent impingement region.

14 Claims, 4 Drawing Sheets

(56) References Cited

U.S. PATENT DOCUMENTS

2011/0198496 A1    8/2011   Ikegami et al.
2013/0056628 A1    3/2013   Holle et al.

OTHER PUBLICATIONS

Zavalin, A. et al., "Direct imaging of single cells and tissue at sub-cellular spatial resolution using transmission geometry MALDI MS", Journal of Mass Spectrometry, Vo. 47, No. 11 (2012).

Kompauer, M. et al., "Autofocusing MA LDI mass spectrometry imaging of tissue sections and 3D chemical topography of nonflat surfaces", Nature Methods (2017), DOI:10.1038/NMETH.4433.

Malys, B. et al., "Diagnosing and Correcting Mass Accuracy and Signal Intensity Error Due to Initial Ion Position Variations in a MALDI TOFMS", J. Am. Soc. Mass Spectrom. vol. 29, pp. 422-434 (2018).

Piotrowski, M. et al. "A Method for Defining the Position of Ion Formation in a MALDI TOFMS by Analysis of the Laser Image on the Sample Surface", J. Am. Soc. Mass Spectrom. vol. 30, pp. 489-500 (2019).

Spraggins, J. et al., "High-Performance Molecular Imaging with MALDI Trapped Ion-Mobility Time-of-Flight (timsTOF) Mass Spectrometry" Anal Chem. vol. 19; No. 91(22), pp. 14552-14560 (2019).

Kim, K. et al., "Laser Scanner-Stage Synchronization Method for High-Speed and Wide-Area Fabrication", Journal of Laser Micro/Nanoengineering vol. 7, No. 2, (2012).

Soltwisch, J. "Mass spectrometry imaging with laser-induced postionization", Science, vol. 348, Issue 6231, 211-215 (2015).

DEVICE FOR DESORPTION SCANNING OF ANALYTE MATERIAL ON A SAMPLE SUPPORT

FIELD OF THE INVENTION

The invention relates to devices and methods for desorption scanning of analyte material deposited on a (flat, plate-like) sample support. The devices and methods are used particularly in ion spectrometry, e.g., mass spectrometry, mobility spectrometry and mobility-mass spectrometry of the desorbed analyte material.

BACKGROUND TO THE INVENTION

The state of the art is discussed in this introduction with reference to a specific aspect. However, this is not intended to limit the following disclosure of the invention. Useful developments and modifications of what is known from the state of the art may also be applicable beyond the comparatively narrow scope of this introduction, and will become readily apparent to practitioners skilled in the art after reading the disclosure of the invention which follows this introduction.

Mass spectrometry imaging (MSI; occasionally also IMS=Imaging Mass Spectrometry) essentially involves the scanning of flat analyte material, e.g., a microtomized (thin) tissue section, using a desorbing beam that releases spatially resolved analyte molecules from the sheet-like analyte material and delivers charged molecular species or analyte ions generated from the molecules to a mass analyzer, e.g., a time-of-flight (TOF) analyzer. Examples include ionization with matrix-assisted laser desorption (MALDI) or ionization by primary ion bombardment (secondary ion mass spectrometry, SIMS) coupled to a time-of-flight analyzer, MALDI-TOF, and SIMSTOF, respectively. The spatially resolved measurement data can be used to compile and display a distribution map of the different analyte molecules across the two-dimensional analyte material.

Imaging mass spectrometry setups originally operated with a stationary beam guide and an x-y translation stage, which could be moved in two dimensions, and on or in which the sample support with the two-dimensional analyte material was located, see for example patent publication US 2008/0017793 A1, also WO 02/084577 A1, but for single preparations. In order to scan the two-dimensional analyte material in such a setup in a spatially resolved manner, the translation stage is adjusted at regular intervals so that a different area of the flat analyte material is in the focus of the desorbing beam after each movement of the stage.

As a movement mechanism, translation stages are relatively sluggish, and moving the stage is therefore quite time-consuming because, when taken together, the flat analyte material, the sample support, and the stage itself amount to quite a large mass that has to be moved with regular repetition over a comparatively short distance of a few micrometers (in a stop-and-go cycle). In addition, the best possible positioning accuracy of commercially available stepper motordriven translation stages suitable for use in negative pressure is in the single-digit micrometer range, around 2.5 to 3 micrometers, which limits the spatial resolution that can be achieved. Piezo stages with better positioning accuracy for high spatial resolution requirements, which can also withstand negative pressure, are known but very expensive to purchase and therefore unsuitable for industrial production. Furthermore, high-precision stages developed for microscopy are difficult to adapt for use in a desorption ion source, which is almost always operated under negative pressure, due to some significant differences in construction.

Stationary positioning of the sample support, together with the flat analyte material deposited on it, and scanning the analyte material surface by changing the orientation of the desorbing beam is equivalent, in kinematic terms, to purely moving the stage and using a desorbing beam with stationary orientation. An example is provided in the patent publication US 2004/0183009 A1. However, there are practical limits to the area on a sample support which can be scanned purely by means of a beam shift, since ion generation and ion transfer into a connected analyzer via a suitable interface are adversely affected to an increasing extent as the angle of incidence of the beam decreases and flattens relative to the sample support surface. In particular, using a typical time-of-flight analyzer with axial injection of the ions, the deflection from a straightline time-of-flight axis passing through a flight tube is limited to about ±100 micrometers, without additional compensation for the resulting ion beam, whereas a tissue section has an area on the order of square centimeters. A pixel square with an edge length of 100 micrometers fits 100 times into a tissue square with an edge length of 1 centimeter, which means that a pure beam adjustment is not sufficient to scan tissue samples of such dimensions over their entire surface.

Moreover, combinations of stage movement and change in beam orientation became known, e.g., from the patent publication DE 10 2011 112 649 A1 (corresponds to GB 2 495 805 A and US 2013/0056628 A1), which relates to mass spectrometers with sample ionization by matrix-assisted laser desorption (MALDI). Here, the samples are located on a movable support plate, where they are irradiated with a pulsed laser, whose point of impingement on the continuously moving support plate is changed via a system of rotatable mirrors.

The following publications provide additional insight into the technical background of the present disclosure:

The publication by Konstantin Aizikov et al. (Review of Scientific Instruments 82, 054102 (2011)) deals with a vacuum-compatible sample positioning device for MALDI Fourier transform ion cyclotron resonance mass spectrometry.

The study by Andre Zavalin et al (J Mass Spectrom. 2012 November; 47(11)) reports on direct imaging of single cells and tissues at sub-cellular spatial resolution using transmission geometry MALDI-MS.

The work by authors Mario Kompauer et al. (Nature Methods 2017, DOI:10.1038/NMETH.4433) "*Autofocusing MALDI mass spectrometry imaging of tissue sections and 3D chemical topography of nonflat surfaces*" presents an autofocusing atmospheric pressure MALDI-MSI system for the study of 3D sample surfaces with topographic aspect ratios of up to 50, which is designed to keep the MALDI laser focus, fluence, and ablation spot size constant across sample height variations by adjusting the sample stage position according to the sample height profile for each measurement spot. This approach should allow lateral resolutions of ≤10 micrometers for 3D samples.

The work of Brian J. Malys et al. (J. Am. Soc. Mass Spectrom. (2018) 29, 422-434) deals with diagnosing and correcting mass accuracy and signal intensity error due to initial ion position variations in a MALDI-TOF MS.

The study by Michelle Piotrowski et al. (J. Am. Soc. Mass Spectrom. (2019) 30, 489-500), presents a method for determining the position of ion generation in a MALDI-TOF MS by analyzing a laser image on the sample surface.

The publication by Jeffrey M. Spraggins et al (Anal Chem. 2019 Nov. 19; 91(22) 14552-14560) explains an investigation of high-performance molecular imaging with MALDI trapped ion mobility time-of-flight (timsTOF) mass spectrometry.

The paper by Kyunghan Kim et al. (JLMN-Journal of Laser MicroNanoengineering Vol. 7, No. 2, 2012), presents a method for instantaneous synchronization of a laser galvanometer scanner and a linear stage for fast and wide-area material fabrication of, for example, flexible printed circuit boards. No further use or investigation of the laser-ablated material is intended. The position and velocity information of the linear stage is transmitted via an encoder signal to the control board of the galvanometer scanner, which calculates the step size of the laser beam movement by subtracting the original CAD data from the movement of the linear stage (CAD=computer assisted design).

In view of the above discussion, there is a need for devices and methods which, despite a precision in the motion of some of the components used being designed to meet certain requirements for spatial resolution of scanning, enable accurately localized desorption of analyte material over extended surface areas, also at high demands. Further objectives that can be achieved by the invention will be immediately clear to the person skilled in the art from reading the disclosure below.

BRIEF SUMMARY OF THE INVENTION

According to a first aspect, the disclosure relates to a device for desorption scanning of analyte material deposited on a sample support, comprising:—a beam device arranged and configured to direct a beam that locally desorbs analyte material onto an impingement region on the sample support; —an interface arranged and configured to receive locally desorbed analyte material and deliver it to an analyzer or analysis device; —a translation device arranged and configured to vary a position of the sample support relative to the interface (along at least one dimension) in order to move to different, predetermined non-congruent impingement regions; —a position monitoring device arranged at or near the translation device and configured to collect data for determining an actual position of the sample support; and—a control system arranged and configured to communicate with the beam device, the translation device and the position monitoring device as well as control and coordinate their operation. This control system coordinates the operation of the beam device and the translation device such that each impingement region is arranged so that locally desorbed analyte material can be received by the interface. The control system detects any deviation of the actual position from a desired or target position of the sample support using the data of the position monitoring device, and, if such a deviation is detected, derives an adjustment of the beam orientation therefrom so that the beam is directed onto an impingement region that results when there is no deviation.

The inventors have recognized that inaccuracies in translation device motion, which occur because the translation device is designed to meet lower spatial resolution requirements, can be compensated for by promptly and quickly adjusting the orientation of a desorbing beam. This makes it possible to reliably achieve a spatial resolution down to 5-10 micrometers when scanning analyte material under investigation, even using simple, robust translation facilities. This improves the performance of analytical devices such as mass spectrometers and/or mobility-mass spectrometers, particularly in imaging mass spectrometry and high-throughput analysis of single preparations very closely spaced on a sample support, such as in the characterization of pharmaceutical drug candidates. The principles of the disclosure are applicable to stepwise motions of the translation device (in stop-and-go cycles) as well as quasi-continuous motions (for example, with many, consecutive, single steps performed at high frequency, which are perceived as nearly continuous).

In various embodiments, the position monitoring device can be configured as a linear rotary encoder or incremental encoder, capacitive sensor system or light optical sensor system. For example, an incremental encoder may itself be based on optical techniques and provide resolutions in the range of a few 100 nanometers, particularly through interpolation. However, any type of robust position sensing with adequate resolution is suitable for determining data on any positioning errors and for further processing for adjusting the orientation of the desorbing beam.

In an optical sensing embodiment, the position monitoring device can exploit high-precision interference measurements of coherent light. For example, it is possible to provide the translation device itself, particularly a piezo stage, or the sample support, particularly on its narrow sides, with reflective features onto which coherent light is directed. The light reflected back from these reflective features can be picked up by an opto-receiver and checked for interference patterns with the emitted light, whereby in particular continuous maxima can be counted. Using this collected data, the position of the sample support can be derived with nanometer-level accuracies directly, if the sample support itself is monitored, or indirectly, if the reflective features are located on the translation device. Suitable devices can determine the position along one spatial direction (x), two spatial directions (xy), or even three spatial directions (xyz), for example using a number of appropriately aligned light paths and reflective features. In a further variant, the position monitoring device can also work with a high-resolution camera image of the area in which the translation device moves the sample support, with a specialized image evaluation program instantaneously comparing actual position and target position of the sample support. The camera collects the data by observing the position of the translation device and/or the sample support, preferably in incident light; however, if the assembly/assemblies is/are largely transparent, it could also work in transmitted light. It is also possible to use multiple camera images taken from different angles and then combined. In this way, multi-dimensional positioning errors can be included and compensated for when adjusting the beam orientation.

In various embodiments, the beam device can include a laser beam generator or an ion beam generator. An ion beam can be a primary ion beam for the bombardment of the analyte material, which leads to the formation of secondary ions (SIMS). The ion beam can have a continuous or pulsed ion current. A laser beam, as a beam of coherent light, can be emitted from, for example, a solid-state laser (especially Nd:YAG), gas laser (nitrogen, Na), dye laser, or a light-emitting laser diode. For this photo-optical desorption, the analyte material can have been specially prepared to exhibit the best possible light absorption properties, e.g., with a matrix material for MALDI ionization. The laser beam can have a continuous or pulsed flow of photons. If necessary, ionization in the course of desorption can be supported by a post-ionization modality, such as so-called MALDI-2 (Jens Soltwisch et al., Science, Apr. 10, 2015, Vol 348, Issue 6231, 211-215) or secondary neutral mass spectrometry (SNMS). For example, a post-ionization modality can be achieved using a laser pulse irradiated laterally into the desorption cloud shortly after desorption, before the desorbed analyte material is transferred through the interface into an analyzer. A desorbing laser beam can have a modified beam cross-section e.g., with several separate intensity peaks, as described in the patent publications DE 10 2004 044 196 A1 (corresponds to GB 2 421 352 A and US 2006/0071160 A1) and DE 10 2005 006 125 A1 (corresponds to GB 2 423 187 A and US 2006/0186332 A1).

In various embodiments, the beam device can comprise adjustable beam-directing elements that are controlled to adjust the beam orientation. Preferably, the beam-directing elements include galvanometer micromirrors for a laser beam, or pairs of opposing DC electrodes for an ion beam. For a laser beam, an arrangement of reflective elements such as mirrors, refracting elements such as prisms, and/or electro-optical or acousto-optical deflection elements such as electro-optical crystals, can be used, in particular, and this arrangement is able to change or shift a position where the desorbing beam impinges on the sample support surface, or on the analyte material thereon, in two spatial directions along a plane parallel to the sample support surface, e.g., by tilting or otherwise changing the spatial orientation. For an ion beam, a system of opposed deflection electrodes supplied with a potential can be used, which surround the ion beam path and can generate variable potential gradients in the space between the two opposing electrodes of a pair. An example is two opposing electrode pairs, 90° to each other. If the electric potential applied to the two opposing electrodes of a pair is the same, an ion beam passing through this pair will not experience any lateral deflection. If the electric potentials are not the same, the primary ions are deflected as a function of the potential difference during fly-through.

In various embodiments, an impingement region can be (i) essentially fully scanned by the desorbing beam or (ii) subdivided into a multitude of sub-regions, which are scanned by the beam in a predetermined sequence. A "macro-motion" generated by the translation device, e.g., a typewriter-style or serpentine-like movement to impingement regions in lines across the sample support, which can be carried out in rapidly successive steps, if necessary also quasi-continuously, can be superimposed with a "micro-motion" across the individual impingement regions, e.g., a scanning of sub-regions of an impingement region by means of a pure change in the beam orientation. The latter design allows, in particular, comparatively fast and easy adjustment of the orientation of the desorbing beam in two spatial directions along a plane parallel to the sample support surface. An impingement region, or subregion thereof, is usually the unit of smallest spatial resolution in an image representation of the data acquired over a larger area of the analyte material with the analysis device. However, the data from a subdivided impingement region do not necessarily have to be considered separately, but can also be combined. A retrospective reduction of the spatial resolution in a graphic representation or distribution map of the molecular content of sampled analyte material is always possible in the post-processing by combining measurement data that was acquired spatially separately, e.g., from different sampling sites.

In various embodiments, the interface can have an axis that is essentially parallel to a surface normal of the sample support, and along which locally desorbed analyte material is delivered to the analysis device. The arrangement of the interface such that its projection encompasses the impingement region and desorption site on the sample support is advantageous, since desorbed analyte material always moves away from the sample support surface and thus already has a velocity component in the direction of the interface without any further action. However, it is equally possible, additionally or alternatively, to actively drive the charged desorbed analyte material toward the interface, for example using suitable static or pulse-switched potential gradients between the sample support and the interface.

In various embodiments, the beam device can be arranged and configured such that the desorbing beam impinges on the sample support at an angle of incidence to a surface normal. This embodiment is preferred when the desorbed analyte material is received along the surface normal to the impingement region and desorption location from the interface and delivered to the analysis device. One example is a time-of-flight analyzer with axial acceleration into the flight path, such as Bruker's Microflex® mass spectrometer.

In various embodiments, the translation device can be arranged and configured to change the position of the sample support in an xy-plane that is essentially perpendicular to the (i) axis of the interface and/or (ii) surface normal of the sample support. In particular embodiments, the axis of the interface and any surface normal of the sample support, regardless of their starting point, are preferably at least parallel or even identical; the latter in particular with respect to a surface normal emanating from an adjusted impingement region. Preferably, the beam device is additionally arranged and configured to track a position of a beam focus on the analyte material in response to the derived adjustment of the beam orientation in a direction essentially perpendicular to the xy-plane. In particular, the beam device may comprise adjustable imaging lenses for tracking the beam focus. The preferred translation devices are xy translation stages or comparable actuators designed to adjust or move the sample support deposited on or in them, together with the analyte material, in two spatial directions parallel to a plane of the sample support surface. The larger the movement radius of the adjustment device for changing the orientation of the desorbing beam, the lower the requirements regarding the smallest step size of the translation stage can be, since the movement of the desorbing beam can cover the impingement regions between two activations of the translation stage. Conventional step sizes of a translation stage may be in the range of twodigit to three-digit micrometer intervals.

In various embodiments, the movement mechanism for the sample support, particularly implemented in or on the translation stage, can also include the possibility of adjustment along a third spatial direction (z-axis), for example to adapt an optimal focal point of a desorbing beam on analyte material that varies in thickness or height, as described in the patent publication DE 10 2007 006 933 A1 (corresponds to US 2008/0191131 A1 and GB 2 446 699 A) of the applicant. When irradiating at an angle, this z-adjustment also results in an adjustment in the spatial directions xy perpendicular to it (i.e., to the sample support surface), which can be compensated for using the adjustment of the beam orientation described herein.

In various embodiments, an impingement region can be selected to allow a sample support surface normal emanating from the impingement region to pass through the interface to ensure that locally desorbed analyte material can be delivered to the analysis device.

In various embodiments, the analyzer or analysis device can be a mobility analyzer, mass analyzer, or combined mobility-mass analyzer. In general, the terms ion-spectrometric analyzers and measurement methods can be used, which can include mobility separation, mass separation, or a combination of both.

A mobility analyzer separates charged molecules or molecular ions according to their collision cross-section to charge ratio, sometimes designated by Q/z or a/z. The basis for this is the interaction between the ionic species and an electric field that couples with the charge of the ions, and the simultaneous effect of a buffer gas which interacts with the average cross-sectional area of the ion. Already known are, particularly, drift-tube mobility separators with static electric field gradients, which drive ions through an essentially stationary gas. Here, the drift velocity of an ionic species is given by the propulsive force of the electric field and the decelerating force of the collisions with the gas particles. Equally common are trapped ion mobility separators (TIMS) with a continuous laminar gas flow driving the ions forward, said gas flow being counteracted by a gradually changed electric field gradient with correspondingly variable deceleration force. Traveling-wave mobility separators are also worthy of mention.

A mass analyzer, on the other hand, separates charged molecules or molecular ions according to their mass-to-charge ratio, usually designated as m/z. In addition to the aforementioned time-of-flight analyzers, for which both linear and reflector setups or setups with axial or orthogonal acceleration of ions into the flight path can be chosen, other types of mass-dispersive separators can also be used, e.g., quadrupole mass filters (single quads), triple quadrupole analyzers ("triple quads"), ion cyclotron resonance cells (ICR), Kingdon-type analyzers such as the Orbitrap® (Thermo Fisher Scientific), and others. Separators of the previously mentioned types can, of course, be coupled to enable ionic species to be separated multidimensionally, i.e., according to more than one physico-chemical property, such as m/z and $\Omega/z$ or $\sigma/z$.

In various embodiments, the interface can comprise electrodes to which electrical potentials can be applied to guide locally desorbed, charged analyte material. These can be diaphragm electrodes, e.g., plates of electrically conductive material having an aperture. These designs are particularly suitable as extraction electrodes for accelerating the desorbed analyte material into a flight path. Additionally or alternatively, electrodes supplied with high-frequency voltages can also be used, as is the case, for example, in a high-frequency voltage ion funnel, a device designed to condense spatially widely dispersed ions into a comparatively thin beam. The electrical potentials can be permanently applied to the connectable electrodes, resulting in permanent potential gradients, and/or they can be switched on in pulses, e.g., timed to coincide with a desorption event in an impingement region on the sample support.

The analyte material can be a tissue section. The molecular content of a (thin) tissue section is preferably measured with spatial resolution of its molecular content in order to create and visualize a distribution map of molecules of interest, e.g., biomolecules such as peptides, lipids (phospholipids and glycolipids), oligosaccharides, sterols, glycans, secondary metabolites, or fat-soluble vitamins, but also other, possibly non-tissue molecules such as active medicinal substances (pharmaceutical substances) and/or their degradation products. Persons skilled in the art will consider that the analyte material can also have a tissue microarray (TMA) or an array of separate preparations, for example sample material which is matrix-prepared as per the dried droplet method for subsequent MALDI ionization. The impingement regions can then comprise lyophobic or hydrophilic regions on a metallic or otherwise electrically conductive sample support, which are separated from each other by lyophilic or hydrophobic regions on the sample support and thus isolated, as in the form of the AnchorChip™ plates from Bruker.

In various embodiments, the impingement regions can have a polygonal outline. It is thus possible to create an array of impingement regions that covers the underlying surface of the sample support and the analyte material deposited on it with virtually no gaps. Examples are rectangles, such as squares, and also polygons with a greater number of angles, such as hexagons. The contours of the impingement regions can be uniform across the whole sample support. However, it is also possible in principle to define impingement regions with varying shapes in the same scanning run, if this is useful for the application. It is also possible to design the contours of impingement regions differently. The scope for a person skilled in the art is virtually unlimited.

In various embodiments, the information gained with the analyzer from the sampled impingement regions can be combined to form a spatial distribution map of ions, or underlying molecular substrates, across the analyte material. This makes it possible to illustrate the distribution of the intrinsic molecules as well as extrinsic ones across the analyte material, in the manner of non-optical microscopy with a label-free measurement, in contrast to staining methods in optical microscopy, for example.

According to another aspect, the disclosure relates to a method for desorption scanning of analyte material deposited on a sample support, comprising the steps: (a) setting a position of the sample support (along at least one dimension) to approach an impingement region onto which a beam is directed for local desorption of analyte material; (b) determining an actual position of the sample support after setting the position; (c) comparing the determined actual position with a desired or target position of the sample support to determine any deviation; (d) adjusting a beam orientation, if a deviation is detected, so that the beam is directed onto the impingement region on the sample support that results when there is no deviation; (e) applying the beam to the impingement region to locally desorb analyte material and deliver it to an analyzer or analysis device; and (f) checking whether a predetermined end condition is satisfied and, if not, repeating steps (a)-(e) for a subsequent non-congruent impingement region.

In the context of the present disclosure, determining an actual position of the sample support after setting the position in step (b) may consist in collecting data to determine the actual position of the sample support in a decay time of the movement of the high-mass translation device assembly at a high clock rate (for example, in the range of 10 kHz or more) when the drive of a translation device performing the position setting has already stopped acting after completion of a stepped movement. The high clock rate of data collection from a position monitoring device then allows timely actuation of the beam device for alignment correction while subsequent oscillations of the translation device are still decaying. The fast response of the beam device, in the order of kilohertz, is able to compensate for the small-scale deflections of the translation device around the equilibrium position caused by the oscillations, such that application of the beam to the stepped impingement region can be started quickly. This approach can save several milliseconds of decay waiting time per stepped position setting; this is particularly advantageous in the scanning of large-area tissue sections, which may require several million stepped position settings.

A final condition can be fulfilled when the desorbing beam has been applied to all planned impingement regions on the sample support or on the analyte material. In extreme cases, the beam can be applied to the point where the analyte material has been essentially completely removed by the action of the desorbing beam in all planned impingement regions, such that the desorbing beam is unable to generate additional desorbed analyte material. Another example of an end condition may be when a number of impingement regions of particular interest, which may be smaller than the total area of an extended analyte material, have been scanned leaving certain sections unimpacted by the beam, e.g., areas of different cell types in a (thin) tissue section. The termination condition can also essentially be defined as a malfunction during execution of the method, e.g., because a mirror has jammed in the beam line.

Since the method according to the disclosure is suitable as a mode of operation of the device according to the disclosure, the embodiments explained above with reference to the device are also applicable to the method in a corresponding manner.

BRIEF DESCRIPTION OF THE ILLUSTRATIONS

The invention can be better understood by referring to the following illustrations. The elements in the illustrations are not necessarily to scale, but are primarily intended to illustrate the principles of the invention (mostly schematically). In the illustrations, the same reference numbers designate corresponding elements in the different views.

FIG. 1 shows, for purposes of categorizing the disclosure, a schematic LDI axial reflector TOF arrangement with and in which the principles of the disclosure can be implemented.

FIG. 2A schematically illustrates the challenges addressed by the disclosure in regard to using a translation device whose performance characteristics do not meet the stated requirements for spatial resolution of a scan.

FIG. 2B shows a microscopic image of a scanned sample support surface without beam alignment correction.

FIG. 2C schematically illustrates a mode of operation according to principles of the disclosure.

DETAILED DESCRIPTION

While the invention has been illustrated and explained with reference to a number of embodiments, those skilled in the art will recognize that various modifications in form and detail can be made without departing from the scope of the technical teaching, as defined in the attached claims.

Figure 1:
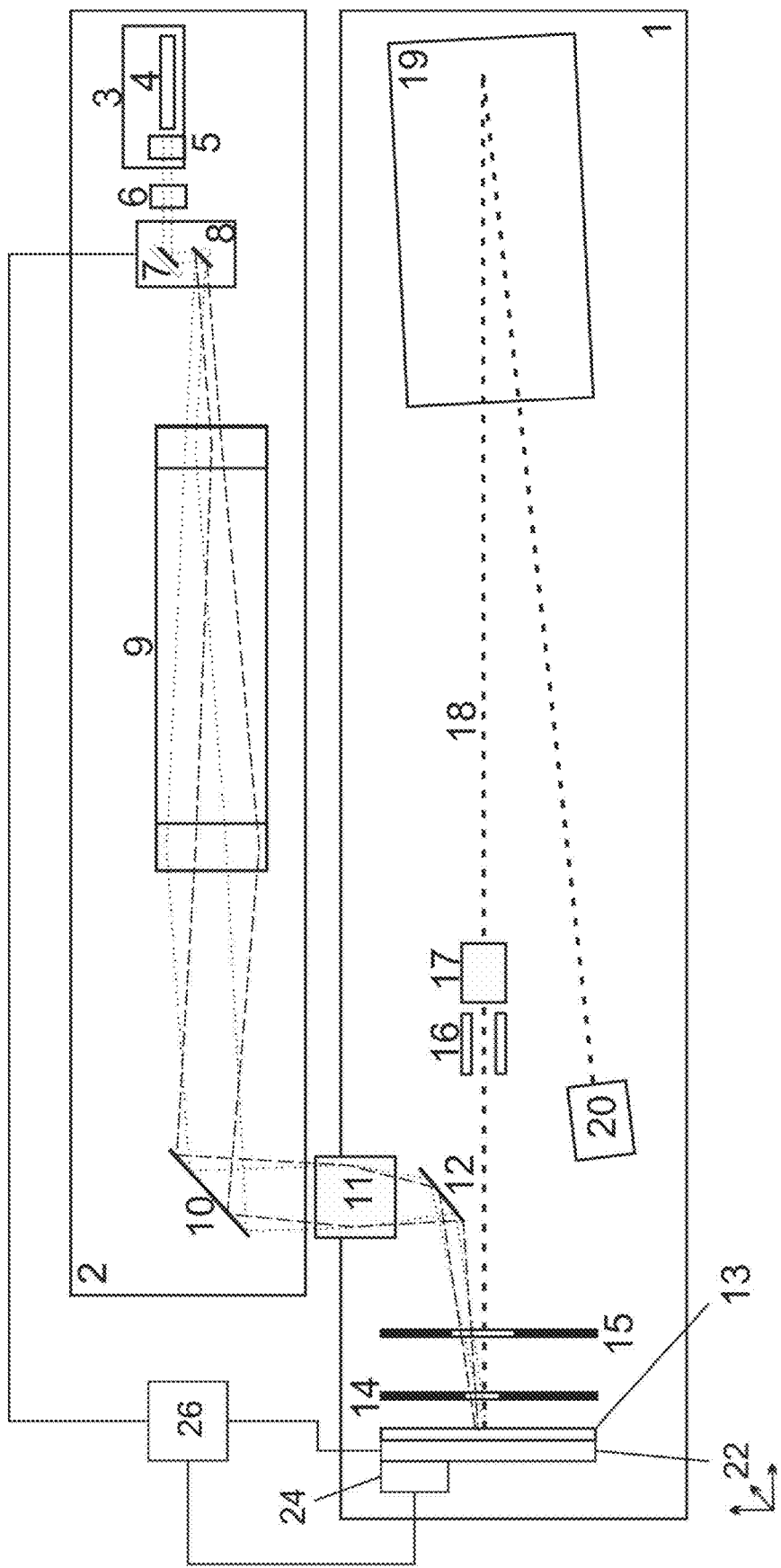

FIG. 1 schematically illustrates a MALDI time-of-flight mass spectrometer (adapted from DE 10 2011 112 649 A1 cited in the introduction) for purposes of categorizing the disclosure. It comprises a time-of-flight analyzer (1) and a beam device (2) that has a mirror system (7, 8) for controlling the orientation of the laser beam relative to the surface of the sample support (13) that carries the analyte material. The usually pulsed laser beam is generated in the beam generation unit (3), which contains a laser crystal (4) and, if necessary, a device (5) for multiplying the laser frequency. It is then provided with intensity peaks in the pattern generator (6) (for example, according to the principle set out in DE 10 2004 044 196 A1; corresponding to US 2006/0071160 A1 and GB 2 421 352 A), and deflected in the mirror system by two galvo mirrors (7) and (8) in two spatial directions so that the impingement position of the laser beam on the sample support surface can be shifted.

The deflected laser beam is then expanded in a Keplerian telescope (9) and shifted in parallel according to the angular deflection. The exiting laser beam is directed with a reduced angle of deflection via the mirror (10) and into the object lens (11), now perfectly centered again. Depending on the angular deflection, the beam passes through the center of the object lens (11), but at slightly different angles, thus shifting the position at which it impinges on the sample support (13). It should be noted here that the beam guidance within a Keplerian telescope (9) is more complex and the illustration does not reproduce it realistically for reasons of simplicity, although the illustration does correctly depict the external effect of the telescope on the laser light beam.

The desorbed charged molecules and ions generated in the desorption clouds of the incident laser beam are accelerated by electric potentials at the interface to the mass analyzer, which has the diaphragms (14) and (15) pulse-wise connected with electric potentials, to form an ion beam (18), which passes through the two deflection capacitors (16, 17) for path correction, and is focused in the reflector (19) onto the detector (20) (LDI axial reflector TOF arrangement). The sample support (13) is coupled to a translation device (22), placed on a translation stage, for example, which can be adjusted in one, two or even three spatial directions (xyz) in order to approach the impingement region of the analyte material on the sample support targeted by the laser beam. Attached to, or located close to, the translation device (22) is a position monitoring device (24), e.g., a linear rotary encoder or incremental encoder, a capacitive sensor system or an optical sensor system, which is capable of independently determining data on the actual position of the translation device (22) and/or the sample support with high accuracy, e.g., with 0.1 micrometer nominal resolution. Preferably, a position monitoring device whose nominal position-determining accuracy exceeds the smallest possible step size of the translation device by more than a factor of ten is used. If the minimum step size of the translation device is 5 micrometers, this results in a nominal accuracy of the position monitoring device of ≤0.5 micrometers; correspondingly, a minimum step size of 3 micrometers implies a nominal accuracy of ≤0.3 micrometers, etc.

A control system (26) suitable for implementing the principles of the present disclosure, and programmed accordingly, communicates with both the position monitoring device (24) and the adjustable mirrors (7, 8) of the beam device (2) and the translation device (22), and coordinates the operation of the latter two, in particular, with respect to each other. The impingement regions on the sample support are set so that the analyte material desorbed and ionized by the beam can pass through the interface in the form of the two diaphragm electrodes (14, 15). In the arrangement shown, a surface normal to the sample support (13), originating from the set impingement region, passes through the apertures in the diaphragm electrodes (14, 15), essentially parallel to the ion beam (18). In this example, the first diaphragm electrode (14), or more precisely its aperture, sets the frame of geometric acceptance for receiving and transmitting locally desorbed analyte material, because material desorbed on the sample support (13) beyond the outline of this aperture projected onto the sample support surface can no longer be reliably evaluated with a time-of-flight-to-mass imaging calibration and is, furthermore, subject to significant losses in resolution compared to such material desorbed within the projected outline of the aperture on the sample support (13).

The problem addressed by the present disclosure and the solution thereto are explained below with reference to FIGS. 2A-2D. A sample support is covered with analyte material that is to be desorbed, e.g., a microtomed, two-dimensional tissue section or a two-dimensionally extended array of isolated sample preparations at locations marked for this purpose, the latter, for example, on one of Bruker's AnchorChip™ type plate. A desorbing beam is intended to scan different impingement regions of this analyte material so as to locally release molecules and ions, which are delivered via an interface to an analyzer for analysis. The sample support is coupled to a translation device that can change its position relative to the interface along at least one spatial direction, preferably along two spatial directions in a plane, and further preferably along three spatial directions.

The position of the sample support may be defined, for example, as its geometric center or as any other fixed point on or within it. The position and dimensions of the sample support on the translation device are usually preset or known by the instrumental conditions, e.g., a mounting recess or locating features such as clamps, so that the change in position of the translation device can be quickly and easily translated into the change in position of the sample support. Likewise, the position and dimensions of the analyte material on the sample support are known (such as in the case of an AnchorChip™ plate) or can be determined in advance (such as in the case of a tissue section whose exact cut shape and contour are difficult to predict). If necessary, for example if there should be uncertainties in this regard, or if confirmation is desired, they can be monitored or scanned, e.g., optically using a camera and suitable reference marks on the sample support, often located in its edge region.

In a standard orientation, the desorbing beam impinges on a certain area of the sample support surface, which is essentially determined by the position of the translation device. Deflections of the beam setting from this standard orientation are possible and indicated within certain spatial limits; the latter especially when the scanning of the analyte material is performed for the purpose of accelerated execution using a sequence of alternating translation device movements and beam orientation changes, see for example the applicant's recently filed German application 102021114934.7 (corresponding to Ser. No. 17/739,251 in the US and 2208059.2 in the UK). If the beam is to be applied to an area of the sample support surface that is beyond the radius of motion of the beam device, the translation device will move the sample support in the appropriate direction to restore access of the desorbing beam to the analyte material. In a measuring cycle, many such movements of the translation device usually occur, possibly quasi-continuously with a high step frequency, which in principle also increases the cumulative risk of positioning errors occurring, even if the probability of a positioning error in the single movement is low, as often stated by translation stage manufacturers.

Particularly when scanning a tissue section, but also in the case of very densely packed individual preparations, adjacent impingement regions of the beam should be close together, but still spatially separated from each other. Especially in the imaging of flat analyte material, spatial proximity is particularly important in order to extract as much analyte information as possible from the analyte material. A pixel or single preparation spacing of 5-10 micrometers with a comparable pixel or preparation size is considered challenging with the current state of the art. At the same time, it is also important to be able to unambiguously assign analyte information to a narrowly defined surface area of the analyte material as the point of origin, especially in areas of the analyte material where the analyte composition changes significantly, for example from one tissue type to another, or from one single preparation to another.

Figure 2A:
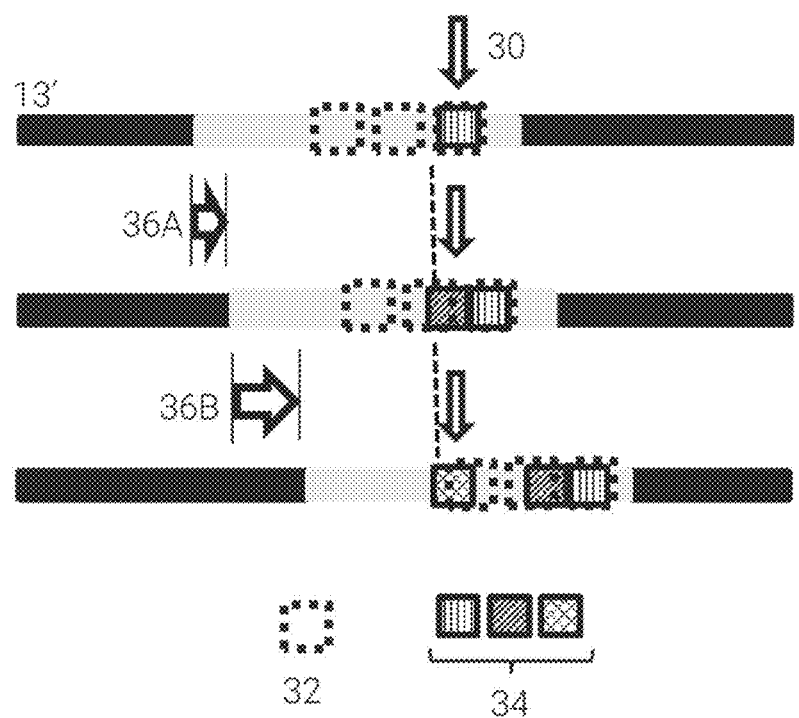
FIG. 2D shows a microscopic image of a scanned sample support surface, similar to FIG. 2B, with beam alignment correction.

With commercially available translation devices, these high demands can only be met to a limited extent. In particular, if requirements for the spatial resolution of the scanning are so high that impingement regions with dimensions of a few micrometers need to be scanned, which are then also displayed as different image elements in a graphical evaluation, the limited precision of the components used up to now becomes noticeable. FIG. 2A schematically illustrates a sample support (13), which carries analyte material (not shown) and is to be scanned by a desorption beam (30) according to a predetermined grid of impingement regions. The planned impingement regions (32) are indicated by dashed squares, see legend below. The corresponding grid plan, which includes both the position of the impingement regions (e.g., a center position or a specified position at the edge or a corner) and the spacing and arrangement of the regions relative to each other, can be specified by a user or created automatically or semi-automatically by a computer program. For simplicity, the present example assumes a grid with a linear array of planned impingement regions (32), although the principles can naturally be applied to two-dimensional scans. It is also assumed that the desorbing beam (30) hits the impingement regions in a fixed orientation, i.e., that there is no micro-movement of the orientation of the beam (30) in the impingement regions in order to sweep a particular area within the radius of motion of the beam (30), as described as a combination of "beam scan mode" and "stage scan mode" in parts of the prior art. However, the principles of the present disclosure are nonetheless applicable to these kinds of embodiments in a corresponding manner.

In addition to the planned impingement regions (32), the actual impingement regions (34) are also shown in the form of variously hatched squares with solid outlines in FIG. 2A. In the top step, the actual impingement region (vertical hatching) and the planned impingement region are congruent. This means that in further data and signal processing, the information coming from this area element of the analyte material is correctly assigned spatially. It also means that this information is obtained from previously unsampled analyte material; in other words, the analyte material has not been modified by prior desorption at this position.

The middle step illustrates a problem of a translation device (not shown) when the movement to a subsequent impingement region is insufficient, and falls short, for instance due to a positioning error. Such a positioning error may be due to the non-uniformity of magnetic fields, which may result from the design of a vacuum motor. This is illustrated by a compressed arrow (36A). The actual impingement region (diagonal hatching) is no longer congruent with the planned impingement region (32); rather, the two regions only half overlap, and this is compounded by the fact that an edge region of the actual impingement region touches an edge region of the previously properly irradiated impingement region (vertical hatching). If the scanning were performed in this orientation, the desorption result would be a mixture of unsampled and already sampled material, which causes unfavorable spatial smearing of the underlying analyte information. Depending on the degree of desorption, for example in the case of complete laser ablation of the analyte material at the previously bombarded location, it is also possible that part of the beam hits the bare sample support surface which distorts quantity information, in particular.

In the bottom step, another problem of the translation device is shown when the movement from a previous impingement region to a subsequent adjacent impingement region does not follow the specifications, but lasts too long, due to a positioning error, for example. This is indicated by the stretched arrow (36B). In this example also, the actual impingement region (crosshatching) is no longer congruent with the planned impingement region (32); again, the two regions overlap only about halfway, with the actual region projecting into a region of the sample support (13) and analyte material that has not yet been sampled by the desorbing beam (30). In both of the aforementioned cases, the planned and actual desorption sites no longer match, which results in unfavorable mapping errors in the measurement data being evaluated.

Figure 2B:
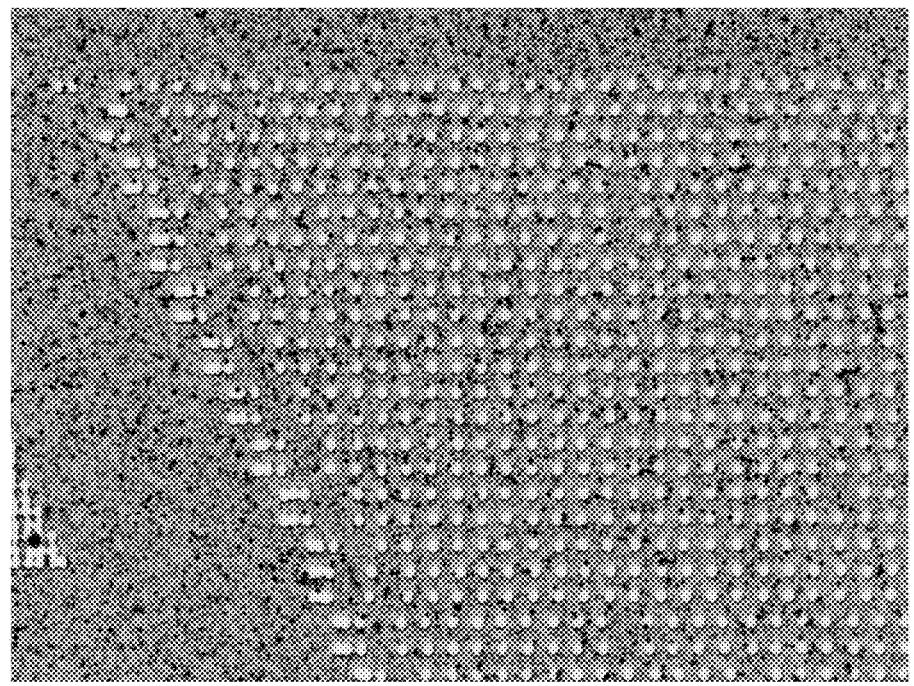

To illustrate these problems in practice, FIG. 2B shows a microscopic image of the ablation craters induced by laser bombardment on a sample support prepared extensively and uniformly with the MALDI matrix substance α-cyano-4-hydroxycinnamic acid (HCCA). Each ablation crater is the result of multiple bombardment of the same site, in this case 30 times, as is commonly used in MALDI data acquisition to increase the signal-to-noise ratio. The image is color-inverted for display purposes, so the ablation craters, which were planned to be 10 micrometers apart horizontally and vertically, appear as white spots. The sequence of movements for sampling different impingement regions comprised only those of a translation stage on which the prepared sample support was located. The alignment of the laser beam, on the other hand, was kept stationary, which is not in accordance with the principles of the present disclosure. As a result, the components used in the example show a large number of irregularities in what was actually planned to be a regular line-column grid, especially at the start of the scanning lines. There, the actual impingement regions partially merge into each other. In the further course of the rows, there are visible gaps between the individual impingement regions that are larger than the planned uniform spacing of 10 micrometers. The column fidelity of the grid, which was planned to be ideal, can only be described as inadequate in practical implementation and with regard to the specified requirements.

Figure 2C:
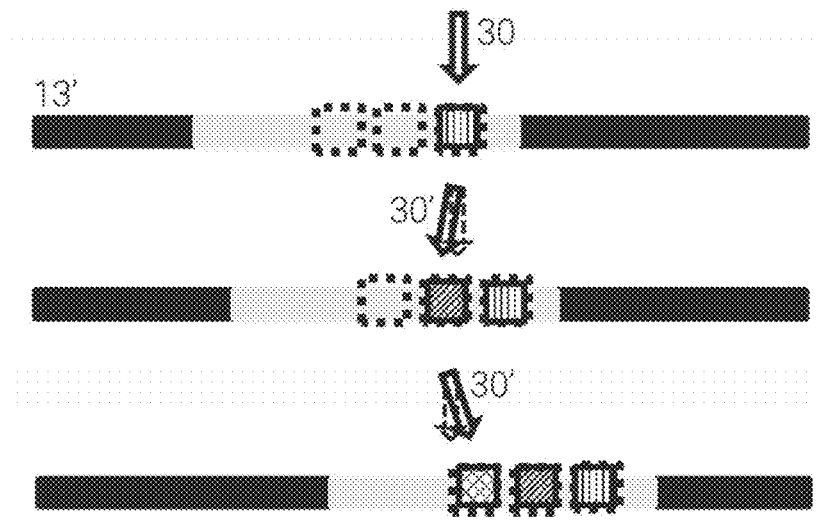

Based on the problems appearing in FIG. 2A and FIG. 2B, FIG. 2C illustrates an approach in accordance with the principles of the present disclosure. It is essential for the implementation of this approach that the beam device never operates with a stationary alignment of the desorbing beam (30), but is controlled in such a way that detected misalignments of the translation device are compensated for by corresponding recalculation of the position coordinates of the impingement regions on the sample support surface and, consequently, of the beam alignment. The information about a misalignment of the translational device is provided by a position monitoring device (not shown), e.g., a high-precision linear incremental encoder, a high-precision capacitive or optical sensor system, which transmits its measurement data to a control system, which can, for example, be a decentralized system composed of many control devices assigned to individual assemblies, such as laser control, translation stage control, etc. Alternatively, the control system can comprise a central control device, which can be designed as a microprocessor or comparable computing unit. If necessary, these computational processes can also be executed in an operating system of a computer that coordinates the analyzer, which is connected via the interface, and in particular the ion source according to a predetermined scanning run, using decentralized control devices, if necessary.

After each movement of the translation device, the position monitoring device collects data on its actual position, from which the position of the sample support (13') and the analyte material deposited on it can be directly derived, or data on the actual position of the sample support itself, and transmits the data to the control system. The control system compares the actual position with the nominal, desired or target position resulting from the previously defined grid plan. If no deviation is detected, or only a deviation within certain tolerances, a control command can be sent to trigger the desorbing beam (30) in the approached position. These tolerances can, for example, be measured in terms of whether a distinguishable distance is maintained between two adjacent impingement regions, and thus originating locations, of desorbed analyte material.

If, on the other hand, a positional deviation is detected, particularly in the three-digit nanometer range or beyond, the difference along the affected spatial directions is determined and input as an offset for a recalculation of the alignment or orientation of the desorbing beam (30). This realignment or alignment adjustment or orientation adjustment is then performed by adjustable beam-directing elements in the beam guiding path, for example by tilting galvanometric beam guiding mirrors in the case of laser ablation (see, for instance, reference marks (7, 8) in FIG. 1) or changing a potential difference applied to paired opposing deflection electrodes in the case of a desorbing primary ion beam. In FIG. 2C, the corrected beam orientation is illustrated with a solid arrow outline (30), whereas the beam orientation planned before the correction is shown as a dashed line. In the top step of FIG. 2C, no adjustment of the beam orientation is required because there is no positional deviation. In the middle step, the beam orientation must be deflected slightly against the direction of movement of the translation device in order to align the planned and actual impingement region. In the bottom step, the beam alignment is deflected slightly in the direction of movement in order to target the planned impingement area. Once the position correction, if required, has been performed by the beam device, which is done in a few milliseconds without any problematic time loss, and only then, is the beam triggered to locally desorb analyte material.

In particular, a mathematically simple case of recalculation or correction of the beam orientation is when the desorbing beam impinges on the sample support surface with an angle of incidence close to zero degrees with respect to the surface normal, because then a deflection of the beam from the standard orientation directly in the plane of impingement corresponding to the surface of the sample support can be treated equally in each direction. Mathematically, it becomes somewhat more complex when the desorbing beam hits the sample support at an angle of incidence other than zero or 180 degrees to the surface normal (depending on the perspective), as schematically illustrated in FIG. 1 with the axial TOF arrangement there. There, charged molecules and ions are preferentially extracted from the ion generation region along the surface normal of the sample support. Slight deviations from this ion extraction axis can be compensated for with respect to mass resolution, for example, by the method described in DE 10 2018 112 538 B3 (corresponding to US 2019/0362958 A1 and GB 2 574

709 A). The angles of incidence in the standard orientation of such axial TOF setups can be 30°-40°.

With such oblique incidence in the standard alignment of the beam, suitable tilting of the mirrors or other adjustment of the beam-directing elements changes not only the beam's position of incidence on the sample support, but also its shape, and in particular it is no longer completely guaranteed that its focus (defined as the area of smallest spatial extent with simultaneously greatest spatial energy density) lies in or on the analyte material where it is supposed to exert its desorbing force. This is all the more true because with oblique incidence, in contrast to incidence parallel to the surface-normal, there is a preferred direction for oblique incidence, which manifests itself in the fact that changes in the beam alignment in the preferred direction have a greater effect on the shape and focus of the beam than changes against (or perpendicular to) the preferred direction, given the same angular increment. As a result, in these kinds of embodiments, the control system must take the oblique incidence into account in the calculations to ensure that the desorbing beam still finds its target properly after adjusting its incidence angle as a function of a detected translation device misalignment. Depending on the extent of the translational misalignment to be corrected by light optics or ion optics, adjusting the alignment of the desorbing beam may also involve adjusting its focus in a z-direction perpendicular to the xy surface of the sample support. For example, the focal position can be changed using an imaging lens disposed in the beam path, whose position in the beam path can be adjusted, for an electromagnetic wave beam, or using an einzel lens disposed in the beam path, whose operating potentials can be adjusted, for a primary ion beam.

Figure 2D:
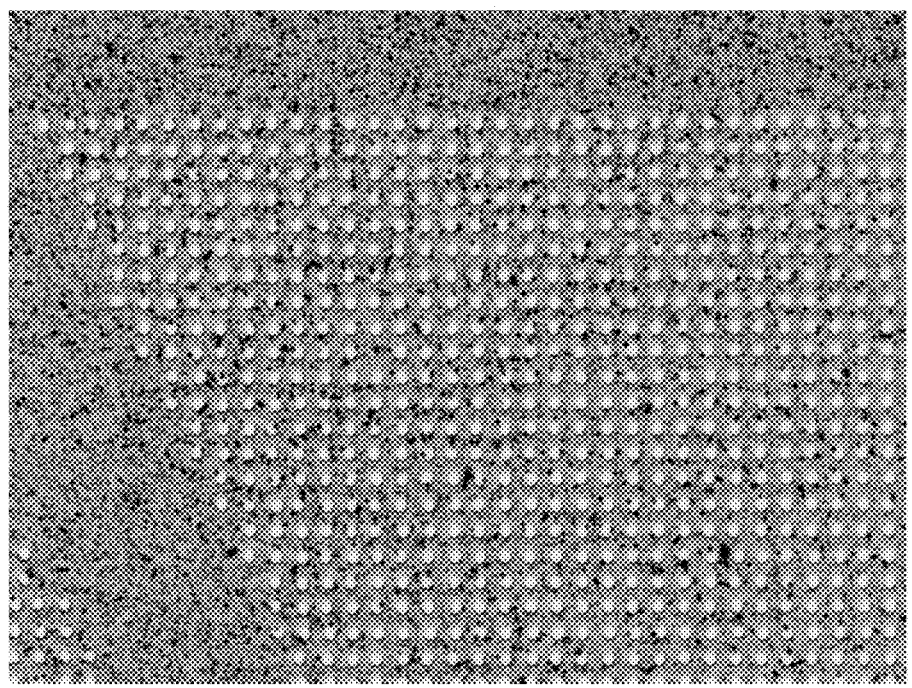

Analogous to FIG. 2B, which shows the result of scanning without corrective modification of a laser beam alignment so that the accuracy of the scan is determined by the precision of the translation stage designed for lower demands, FIG. 2D illustrates the result of the same experiment using a beam alignment correction as a function of the translational misalignments of the translation stage or sample support, determined from data from a position monitoring device. Again, this is a color-inverted representation for illustrative purposes. As can be clearly seen, the ablation craters (white spots) lie in regularly arranged rows and columns. The spacing of the individual spots is largely uniform, at about 10 micrometers. No overlaps of multiple impingement regions are evident. Such a setting makes it possible to ensure a spatially accurate image of the analyte material. The finding from this example can, of course, also be applied to even more sophisticated desorption settings, such as using a diameter of about 3-5 micrometers of the desorbing beam on the analyte material, translation device motion increments of about 5 micrometers, and spacing of about 5-10 micrometers between the adjacent impingement regions being scanned, which are of the same order of magnitude as the translation device motion increments.

Figure 3:
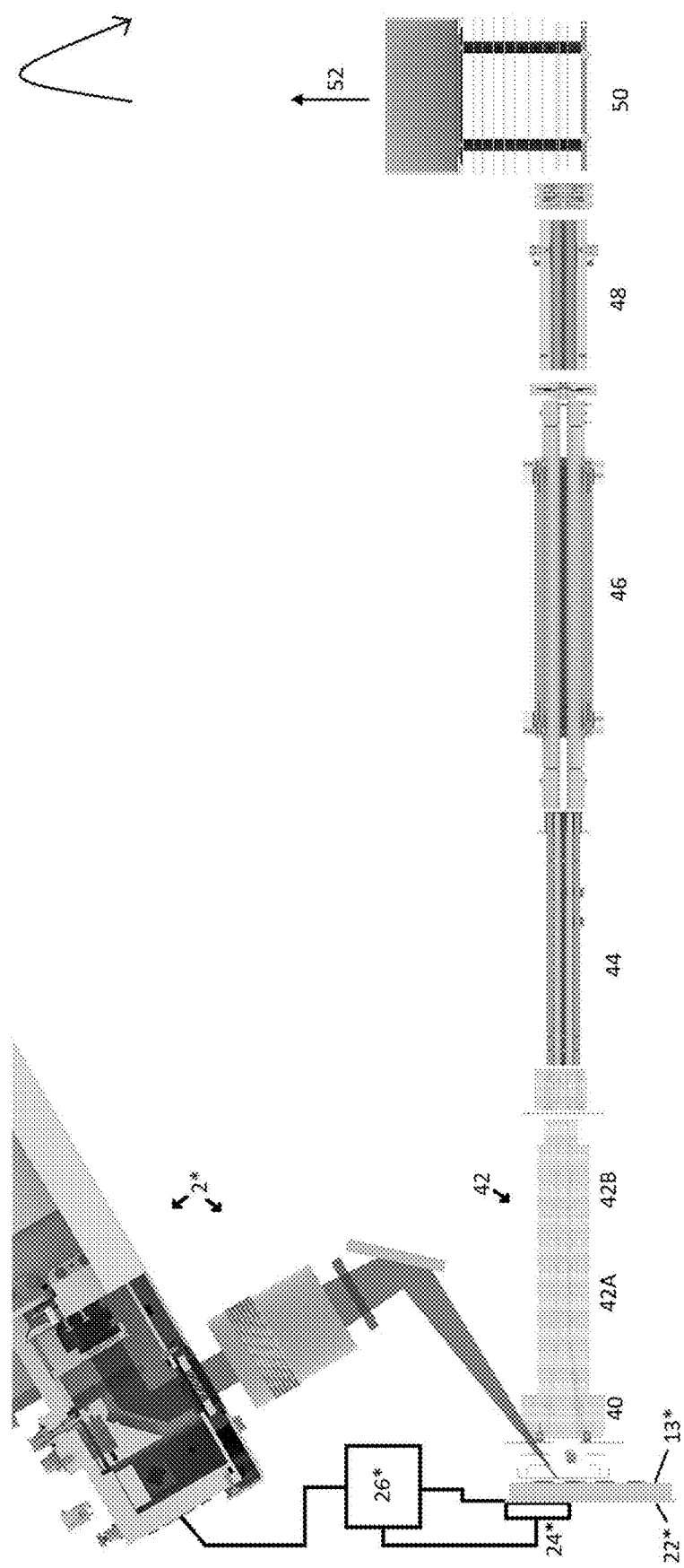
FIG. 3 illustrates, for purposes of further categorizing the disclosure, an LDI-TIMS-Q-FRAG reflector-OTOF arrangement with and in which the principles of the disclosure can be implemented.

For further categorization of the disclosure, FIG. 3 is a schematic diagram of another possible set-up of a device according to the disclosure, wherein the analyzer connected via an interface is a mobility spectrometer-mass spectrometer (adapted from the article by Jeffrey M. Spraggins et al. cited in the introduction). The setup and operation will be explained very briefly:

A laser system as a beam device (2*) with various optical beam guiding elements is designed to pulse bombard analyte material on a sample support (13*). The sample support (13*) can be scanned stepwise to obtain spatially resolved measurement signals from the analyte material, for example from extended two-dimensional analyte material such as a flat tissue section or an array of individually prepared samples, such as locally applied tissue homogenate preparations.

The sample support (13*) is coupled to a translation device (22*), for example deposited on a translation stage, which can be adjusted in one, two or even three spatial directions (xyz) in order to approach the location of the analyte material on the sample support targeted by the laser beam. A position monitoring device (24*), e.g., a linear rotary encoder or incremental encoder, a capacitive sensor system or an optical sensor system, which is capable of independently determining data on the actual position of the translation device (22*) and/or the sample support (13*) with high accuracy, e.g., with 0.1 micrometer nominal resolution, is attached to, or located close to, the translation device (22*). When the position of the translation device itself is determined, the positions of the sample support (13*) and also of the analyte material can be easily derived.

A control system (26*) suitable for implementing the principles of the present disclosure and programmed accordingly communicates with both the position monitoring device (24*) and the adjustable beam-guiding elements (not shown) in the beam device (2*) as well as the translation device (22*), and it coordinates the operation of the latter two in particular. The impingement regions on the sample support (13*) are set so that the analyte material desorbed and ionized by the beam is received by the interface in the form of the high-frequency voltage ion funnel (40) and spatially compressed into a thin ion string for further transmission through the arrangement. In the arrangement shown, a surface normal to the sample support (13*), originating from the set impingement region, passes through the apertures in the electrodes of the funnel (40). The electrode assembly of the first funnel element, or more precisely its aperture, in this example sets the frame of geometric acceptance for receiving and transmitting locally desorbed analyte material. This acceptance range is somewhat larger than in the interface in the example from FIG. 1, but nevertheless, analyte material cannot be desorbed at an arbitrary location on the sample support (13*) in this case either. Accordingly, material desorbed beyond the outline of the first funnel opening projected onto the surface of the sample support (13*) cannot be reliably transferred to the connecting tunnel region of the mobility spectrometer, or only with losses, compared to material desorbed within the projected outline of the largest funnel opening on the sample support (13*).

After it has been generated, the charged analyte material enters a mobility spectrometer (42) via the high-frequency voltage funnel (40). The mobility spectrometer has an accumulating region (42A) and a subsequent analyzing region (42B). The principle of such a dual design is described, for example, in the patent publication US 2016/0231275 A1 of the applicant. An inert gas flows through both regions of the mobility spectrometer (42) (from left to right in the figure). The charged analyte material is driven within it by the gas flow against an opposing electric field. In the analyzing region (42B), the charged analyte material is separated accordingly at different positions along the axis, depending on the respective mobility.

Incremental reduction of the electric field strength in the analyzing region (42B) of the mobility analyzer (42) enables sequential delivery of charged analyte material separated by mobility. After mobility analysis in the analyzing region (42B), the charged analyte material that has collected meanwhile in the accumulating region (42A) is transferred to the analyzing region (42B). The charged analyte material exiting the analyzing region (42B) first passes through a transfer multipole (44) and then enters a quadrupole mass filter (46). Here, the charged analyte material can be selected for further analysis, while other charged analyte material can be filtered out. Subsequently, the charged analyte material is transferred to a collision cell (48), where the selected charged analyte material can be fragmented by accelerated injection into a neutral gas.

In the collision cell (48), the charged analyte material and/or any charged fragments generated from it are temporarily stored before being introduced in a synchronized manner into the puller (50) of a time-of-flight analyzer (52) with orthogonal injection. There, perpendicular to the direction of entry, the analyte material or charged fragments are accelerated into the flight path of a reflector time-of-flight analyzer. At the end of the flight path, after reversing the direction of flight in the reflector (indicated by arrow), a detector (not shown) receives the various time-resolved and thus mass-resolved packets and outputs them as a time-of-flight transient, which can subsequently be rescaled into masses (m) or mass/charge ratios (m/z).

The invention has been described above with reference to different, specific example embodiments. It is to be understood, however, that various aspects or details of the embodiments described can be modified without deviating from the scope of the invention. Furthermore, the features and measures disclosed in connection with different embodiments can be combined as desired if this appears practicable to a person skilled in the art. Moreover, the above description serves only as an illustration of the invention and not as a limitation of the scope of protection, which is exclusively defined by the appended Claims, taking into account any equivalents which may exist.

The invention claimed is:

1. A device for desorption scanning of analyte material deposited on a sample support, comprising:
    a beam device arranged and configured to direct a beam that locally desorbs analyte material onto an impingement region on the sample support;
    an interface arranged and configured to receive locally desorbed analyte material and deliver it to an analysis device;
    a translation device arranged and configured to vary a position of the sample support relative to the interface in order to approach different predetermined non-congruent impingement regions;
    a position monitoring device arranged at or near the translation device and configured to collect data for determining an actual position of the sample support; and
    a control system arranged and configured to communicate with, control and coordinate the operation of the beam device, the translation device and the position monitoring device, wherein the control system coordinates the operation of the beam device and the translation device such that each impingement region is arranged so that locally desorbed analyte material can be received by the interface,
wherein the control system detects any deviation of the actual position from a desired position of the sample support using the data of the position monitoring device, and if such a deviation is detected, the control system derives an adjustment of a beam orientation therefrom so that the beam is directed onto an impingement region that results when no deviation is present.

2. The device according to claim 1, wherein the position monitoring device is a linear encoder or an incremental encoder, capacitive sensor system, or light optical sensor system.

3. The device according to claim 1, wherein the beam device includes a laser beam generator or an ion beam generator.

4. The device according to claim 1, wherein the beam device comprises adjustable beam-directing elements that are controlled to adjust the beam orientation.

5. The device according to claim 4, wherein the beam-directing elements include galvanometer micromirrors for a laser beam or pairs of opposing DC electrodes for an ion beam.

6. The device according to claim 1, wherein an impingement region is (i) essentially fully scanned by the desorbing beam or (ii) subdivided into a multitude of sub-regions, which are scanned by the beam in a predetermined sequence.

7. The device according to claim 1, wherein the beam device is arranged and configured such that the desorbing beam impinges on the sample support at an angle of incidence to a surface normal.

8. The device according to claim 1, wherein the interface has an axis that is essentially parallel to a surface normal of the sample support, and along which locally desorbed analyte material is delivered to the analysis device.

9. The device according to claim 8, wherein the translation device is arranged and configured to change the position of the sample support in an xy-plane that is essentially perpendicular to the (i) axis of the interface and/or (ii) surface normal of the sample support.

10. The device according to claim 9, wherein the beam device is additionally arranged and configured to track a position of a beam focus on the analyte material in response to the derived adjustment of the beam orientation in a direction essentially perpendicular to the xy-plane.

11. The device according to claim 10, wherein the beam device comprises adjustable imaging lenses for tracking the beam focus.

12. The device according to claim 1, wherein an impingement region is selected to allow a sample support surface normal emanating from the impingement region to pass through the interface to ensure that locally desorbed analyte material can be delivered to the analysis device.

13. The device according to claim 1, wherein the interface comprises electrodes to which electrical potentials can be applied for guiding locally desorbed, charged analyte material.

14. A method for desorption scanning of analyte material deposited on a sample support, comprising the following steps:
    (a) setting a position of the sample support to approach an impingement region onto which a beam is directed for local desorption of analyte material;
    (b) determining an actual position of the sample support after setting the position;
    (c) comparing the determined actual position with a target position of the sample support to determine any deviation;
    (d) adjusting a beam orientation, if a deviation is detected, so that the beam is directed onto the impingement region on the sample support that results when there is no deviation;
    (e) applying the beam to the impingement region to locally desorb analyte material and deliver it to an analyzer; and (f) checking whether a predetermined end condition is satisfied and, if not, repeating steps (a)-(e) for a subsequent non-congruent impingement region.

\* \* \* \* \*